United States Patent
Awaji et al.

(10) Patent No.: US 9,675,930 B2
(45) Date of Patent: Jun. 13, 2017

(54) CONTROL METHOD OF PLASMA BY MAGNETIC FIELD IN AN EXHAUST GAS TREATING APPARATUS AND AN EXHAUST GAS TREATING APPARATUS USING THE SAME

(75) Inventors: Toshio Awaji, Sakai (JP); Takashi Nakayama, Izumisano (JP); Toshio Tanaka, Hiroshima (JP)

(73) Assignee: CLEAN TECHNOLOGY CO., LTD., Osaka (JP)

( * ) Notice: Subject to any disclaimer, the term of this patent is extended or adjusted under 35 U.S.C. 154(b) by 717 days.

(21) Appl. No.: 12/752,537

(22) Filed: Apr. 1, 2010

(65) Prior Publication Data
US 2010/0252411 A1   Oct. 7, 2010

(30) Foreign Application Priority Data
Apr. 2, 2009   (JP) ................... 2009-090066

(51) Int. Cl.
*B01D 53/32* (2006.01)
*H05H 1/50* (2006.01)

(52) U.S. Cl.
CPC ............. *B01D 53/32* (2013.01); *H05H 1/50* (2013.01); *B01D 2257/204* (2013.01); *B01D 2257/2066* (2013.01); *B01D 2258/0216* (2013.01); *B01D 2259/818* (2013.01); *H05H 2245/1215* (2013.01)

(58) Field of Classification Search
CPC .. H05H 1/40; H05H 1/24; H05H 1/42; H05H 1/50; H05H 2245/1215; B05B 5/00; B01J 19/08; B01D 53/32; B01D 2257/2066; B01D 2257/204; B01D 2258/0216; B01D 2259/818
USPC ..................... 204/157.15; 422/168
See application file for complete search history.

(56) References Cited

U.S. PATENT DOCUMENTS

| | | | | |
|---|---|---|---|---|
| 2,941,012 A | * | 6/1960 | Forshey, Jr. .................. | 570/150 |
| 2,952,706 A | * | 9/1960 | Lipscomb ................ | 422/186.22 |
| 3,081,245 A | * | 3/1963 | Farlow ..................... | 422/186.22 |
| 3,087,840 A | * | 4/1963 | Shaw ............................ | 422/128 |
| 3,091,920 A | * | 6/1963 | Matvay .................... | 422/186.23 |
| 3,209,189 A | * | 9/1965 | Patrick ..................... | 313/231.31 |
| 3,316,082 A | * | 4/1967 | Barloga et al. .............. | 75/10.2 |

(Continued)

FOREIGN PATENT DOCUMENTS

| | | | | |
|---|---|---|---|---|
| DE | 1271852 B | * | 7/1975 | ............. H05H 1/30 |
| JP | 2008-194551 | | 8/2008 | |

*Primary Examiner* — Keith Hendricks
*Assistant Examiner* — Colleen M Raphael
(74) *Attorney, Agent, or Firm* — Wenderoth, Lind & Ponack, L.L.P.

(57) ABSTRACT

A plasma control method for an exhaust gas treating apparatus includes providing an exhaust gas treating apparatus having a plasma discharge space, a coil disposed on an outer circumference of the plasma discharge space, an upper electrode, and a lower electrode; generating plasma in the plasma discharge space; controlling the state of the plasma generated in the plasma discharge space by generating a magnetic field in the plasma discharge space between the upper electrode and the lower electrode; and cooling the reaction tube using a water cooled jacket disposed around the reaction tube. The magnetic field is generated by applying a current to the coil.

6 Claims, 5 Drawing Sheets

(56) References Cited

U.S. PATENT DOCUMENTS

| | | | | |
|---|---|---|---|---|
| 3,343,022 A * | 9/1967 | Eckert | H05H 1/30 |
| | | | 313/231.31 |
| 3,343,027 A * | 9/1967 | Frohlich | 313/231.41 |
| 3,376,211 A * | 4/1968 | Bjornson | 422/186.03 |
| 3,388,291 A * | 6/1968 | Cann | F03H 1/0075 |
| | | | 313/156 |
| 3,391,238 A * | 7/1968 | Kuhn et al. | 373/85 |
| 3,400,070 A * | 9/1968 | Naff | 422/186.03 |
| 3,456,146 A * | 7/1969 | Hess | 313/231.41 |
| 3,541,379 A * | 11/1970 | Holden | 422/186.2 |
| 3,586,905 A * | 6/1971 | Bignell | H05H 1/36 |
| | | | 219/121.36 |
| 3,695,840 A * | 10/1972 | Pfender | C01B 13/28 |
| | | | 423/613 |
| 3,743,781 A * | 7/1973 | Holden | 219/383 |
| 3,828,162 A * | 8/1974 | Holden | 219/383 |
| 3,852,061 A * | 12/1974 | Wulff | 373/23 |
| 4,386,258 A * | 5/1983 | Akashi | B23K 10/00 |
| | | | 219/121.36 |
| 4,644,877 A * | 2/1987 | Barton et al. | 422/186.23 |
| 4,849,675 A * | 7/1989 | Muller | H01J 27/16 |
| | | | 313/230 |
| 4,945,721 A * | 8/1990 | Cornwell et al. | 422/168 |
| 4,985,213 A * | 1/1991 | Ooe et al. | 422/186.01 |
| 5,188,704 A * | 2/1993 | Babie et al. | 438/714 |
| 5,288,969 A * | 2/1994 | Wong et al. | 219/121.52 |
| 5,607,542 A * | 3/1997 | Wu et al. | 438/707 |
| 5,611,947 A * | 3/1997 | Vavruska | 588/901 |
| 5,824,455 A * | 10/1998 | Komatsu et al. | 438/710 |
| 5,895,558 A * | 4/1999 | Spence | 422/186.05 |
| 5,939,026 A * | 8/1999 | Seki et al. | 204/157.15 |
| 6,468,489 B1 * | 10/2002 | Chang et al. | 422/168 |
| 6,593,507 B2 * | 7/2003 | Ikeda et al. | 588/310 |
| 6,617,538 B1 * | 9/2003 | Mahawili | 219/121.36 |
| 6,689,252 B1 * | 2/2004 | Shamouilian et al. | 204/157.15 |
| 6,851,413 B1 * | 2/2005 | Tamol, Sr. | 123/536 |
| 7,052,662 B2 * | 5/2006 | Duncan et al. | 588/301 |
| 7,429,714 B2 * | 9/2008 | DePetrillo | H05H 1/30 |
| | | | 219/121.48 |
| 7,438,869 B1 * | 10/2008 | Fabian et al. | 422/186.03 |
| 8,877,134 B2 * | 11/2014 | Awaji et al. | 422/186.03 |
| 2001/0025782 A1 * | 10/2001 | Yamaguchi et al. | 204/157.15 |
| 2003/0136659 A1 * | 7/2003 | Yamaguchi et al. | 204/157.15 |
| 2004/0084297 A1 * | 5/2004 | Anazawa et al. | 422/186.03 |
| 2004/0245085 A1 * | 12/2004 | Srinivasan | 204/157.15 |
| 2007/0119825 A1 * | 5/2007 | Staton et al. | 219/121.36 |
| 2008/0056961 A1 * | 3/2008 | Matveev | 422/186.22 |
| 2008/0069966 A1 * | 3/2008 | Otsuki | 427/453 |
| 2009/0001046 A1 * | 1/2009 | Kubota et al. | 216/13 |

* cited by examiner

F I G. 3 (a)    F I G. 3 (b)
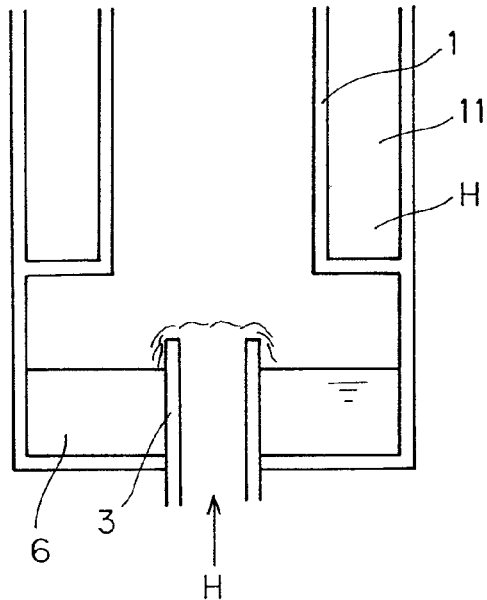 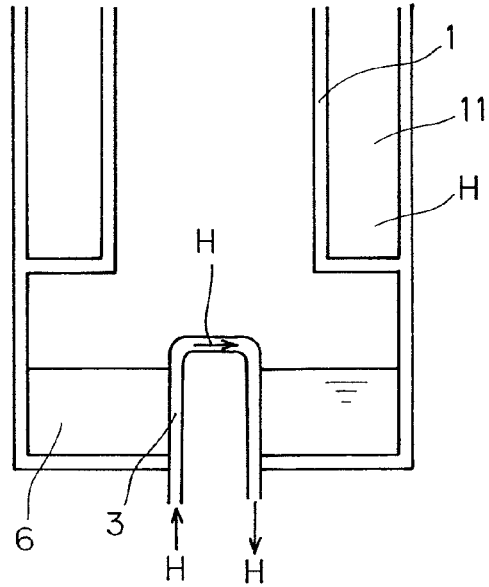
F I G. 3 (c)    F I G. 3 (d)
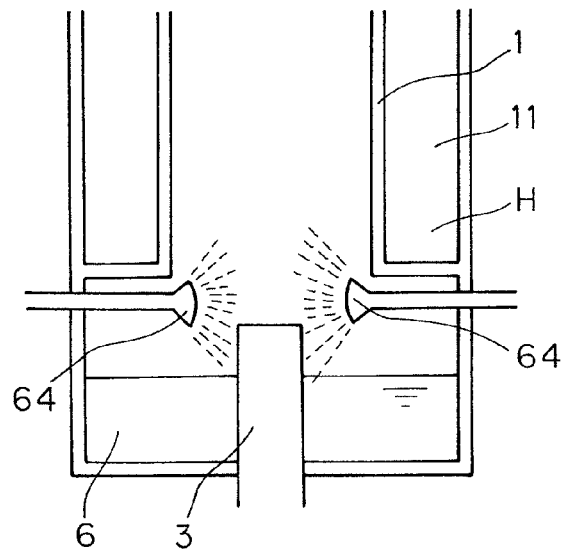 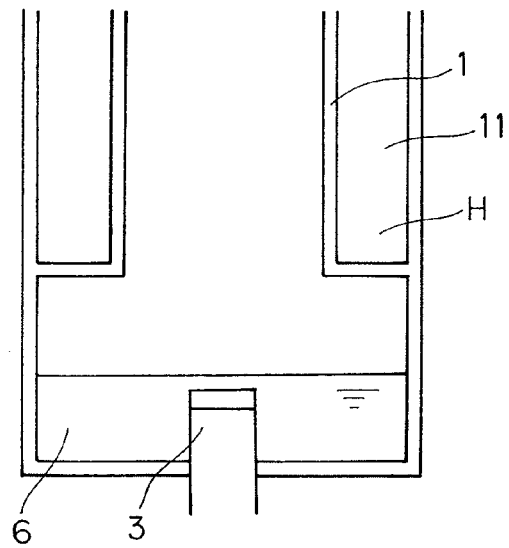

F I G. 6
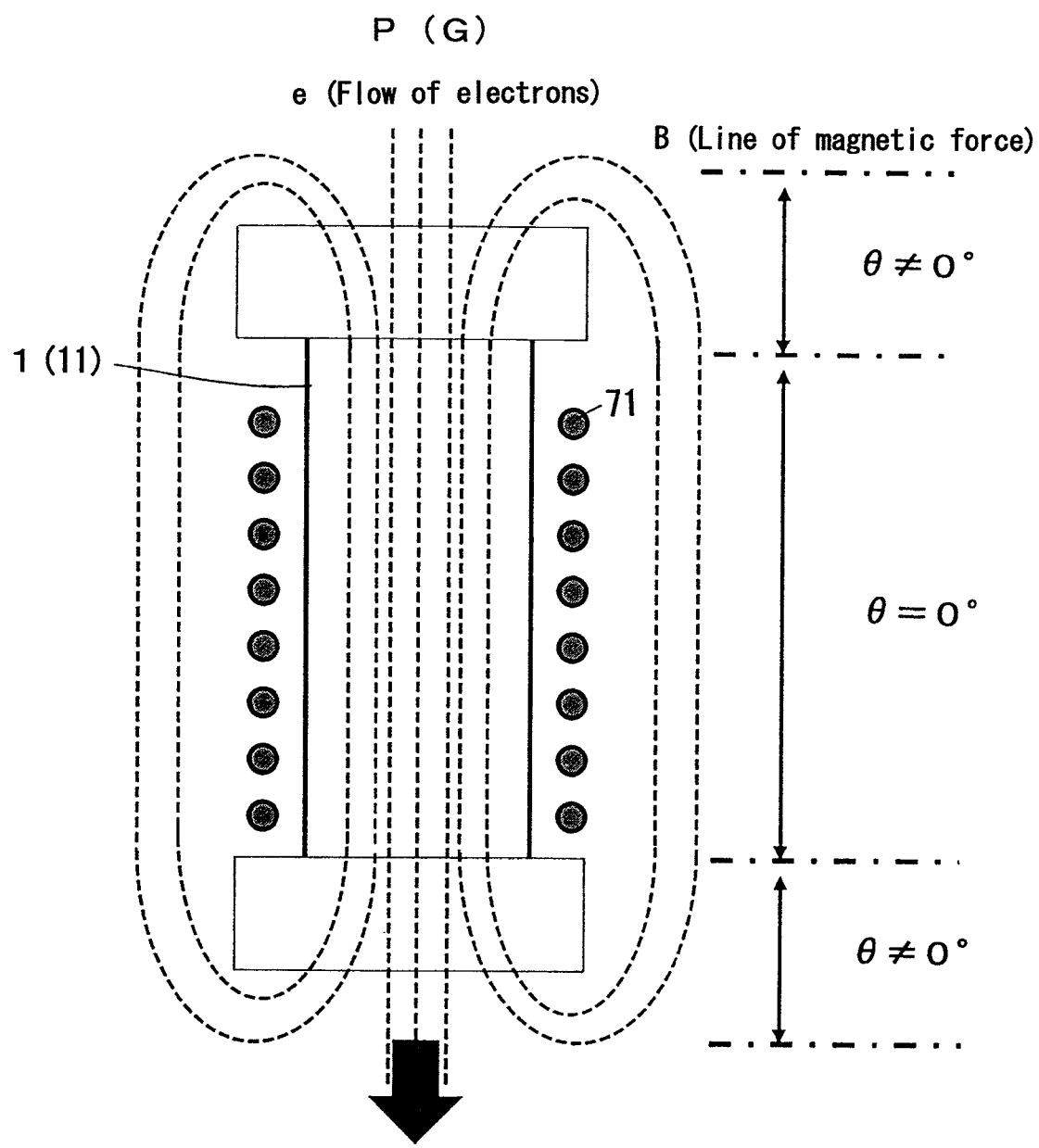

CONTROL METHOD OF PLASMA BY MAGNETIC FIELD IN AN EXHAUST GAS TREATING APPARATUS AND AN EXHAUST GAS TREATING APPARATUS USING THE SAME

TECHNICAL FIELD

The present invention relates to a control method of plasma by a magnetic field in an exhaust gas treating apparatus, and an exhaust gas treating apparatus using the same, and more particularly to a control method of plasma by a magnetic field in an exhaust gas treating apparatus, and an exhaust gas treating apparatus using the same, capable of enhancing the treating efficiency of the exhaust gas by using a plasma, by controlling the state of the plasma by generating a magnetic field

BACKGROUND ART

Conventionally, in the treating process of exhaust gas generated in manufacturing process of semiconductors and the like, exhaust gas treating apparatuses using a plasma are proposed and put in practical use (see, for example, patent document 1).

In this exhaust gas treating apparatus, the method for enhancing the decomposition efficiency of the exhaust gas to be treated includes: (1) a method of extending the plasma length (the discharge distance), (2) a method of reducing the diameter of the reaction tube for feeding the exhaust gas, and (3) a method of inducing a vortex flow by feeding an exhaust gas into the reaction tube from the tangential direction.

However, (1) the method of extending the plasma length (the discharge distance) is intended to raise the treating capacity, and is enhanced in the treating efficiency, but is increased in the energy consumption.

(2) The method of reducing the diameter of the reaction tube for feeding the exhaust gas is raised in the treating efficiency because the contact efficiency between the plasma and the exhaust gas is increased, but is decreased in the absolute amount of treating, and moreover since the tube wall of the reaction tube and the plasma are close to each other, the reaction tube is likely to be damaged, and there was a problem in the aspect of durability of the apparatus.

(3) The method of feeding an exhaust gas into the reaction tube from the tangential direction is higher in the treating efficiency because the contact efficiency between the plasma and the exhaust gas is increased, but is complicated in the structure of the feeding unit of exhaust gas of the reaction tube.

PRIOR ART LITERATURE

Patent Document

Patent document 1: Japanese Patent Application Laid-Open No. 2008-194551

SUMMARY OF THE INVENTION

Problems to be Solved by the Invention

The present invention is devised to solve the problems of the conventional exhaust gas treating apparatus which uses plasma, and it is a primary object thereof to present a control method of plasma in a magnetic field in an exhaust gas treating apparatus capable of enhancing the exhaust gas treating efficiency of the plasma in a simple method and apparatus, without extremely increasing the consumption of energy or lowering the absolute amount of treatment, and an exhaust gas treating apparatus using the same.

Means for Solving the Problems

To achieve the above object, the plasma control method by electric field in the exhaust gas treating apparatus of the invention is characterized by controlling the state of the plasma generated in the plasma discharge space by generating a magnetic field in the plasma discharge space of the exhaust gas treating apparatus.

In this case, by disposing a coil on the outer circumference of the plasma discharge space, and by applying a current in the coil, a magnetic field is generated in the plasma discharge space, or by disposing a magnet on the outer circumference of the plasma discharge space, a magnetic field is generated in the plasma discharge space.

To achieve the same object, the exhaust gas treating apparatus of the invention is an exhaust gas treating apparatus for decomposing and treating the exhaust gas introduced into a reaction tube by the plasma generated in the reaction tube, in which the state of the plasma generated in the reaction tube is controlled by generating a magnetic field in the reaction tube.

In this case, a magnetic field may be generated by disposing a coil on the outer circumference of the reaction tube and passing a current into the coil, or a magnetic field may be generated by disposing a magnet on the outer circumference of the reaction tube.

Effects of the Invention

According to the control method of plasma by a magnetic field in the exhaust gas treating apparatus of the invention and the exhaust gas treating apparatus, by generating a magnetic field in the plasma discharge space (in the reaction tube of the plasma discharge space), and by controlling the state of the plasma generated field in the plasma discharge space (in the reaction tube of the plasma discharge space), more specifically, a Lorenz force acts on electrons and discharge particles forming the plasma by the action of the magnetic field, and scattering of electrons and discharge particles can be prevented, and thereby the state of the plasma can be controlled. As a result, the loss of the plasma not utilized effectively and spent wastefully can be decreased, and the consumption of the energy is not increased extremely or the absolute amount of treatment is not lowered, and therefore the treating efficiency of exhaust gas by plasma can be enhanced using a simple method and structure.

Besides, generation of magnetic field is realized using a simple method and structure of disposing a coil on the outer circumference of the plasma discharge space (the reaction tube in the plasma discharge space), and by applying a current in the coil, or by disposing a magnet on the outer circumference of the plasma discharge space (the reaction tube in the plasma discharge space).

BRIEF DESCRIPTION OF THE DRAWINGS

FIG. 3 is a sectional view of a modified embodiment of a lower electrode.

FIG. 6 is an explanatory diagram of principle of control method of plasma by magnetic field in the exhaust gas treating apparatus of the invention.

EMBODIMENTS OF THE INVENTION

An embodiment of the control method of plasma by magnetic field in an exhaust gas treating apparatus of the invention, and an exhaust gas treating apparatus using the same is explained below by reference to the accompanying drawings.

Figure 1:
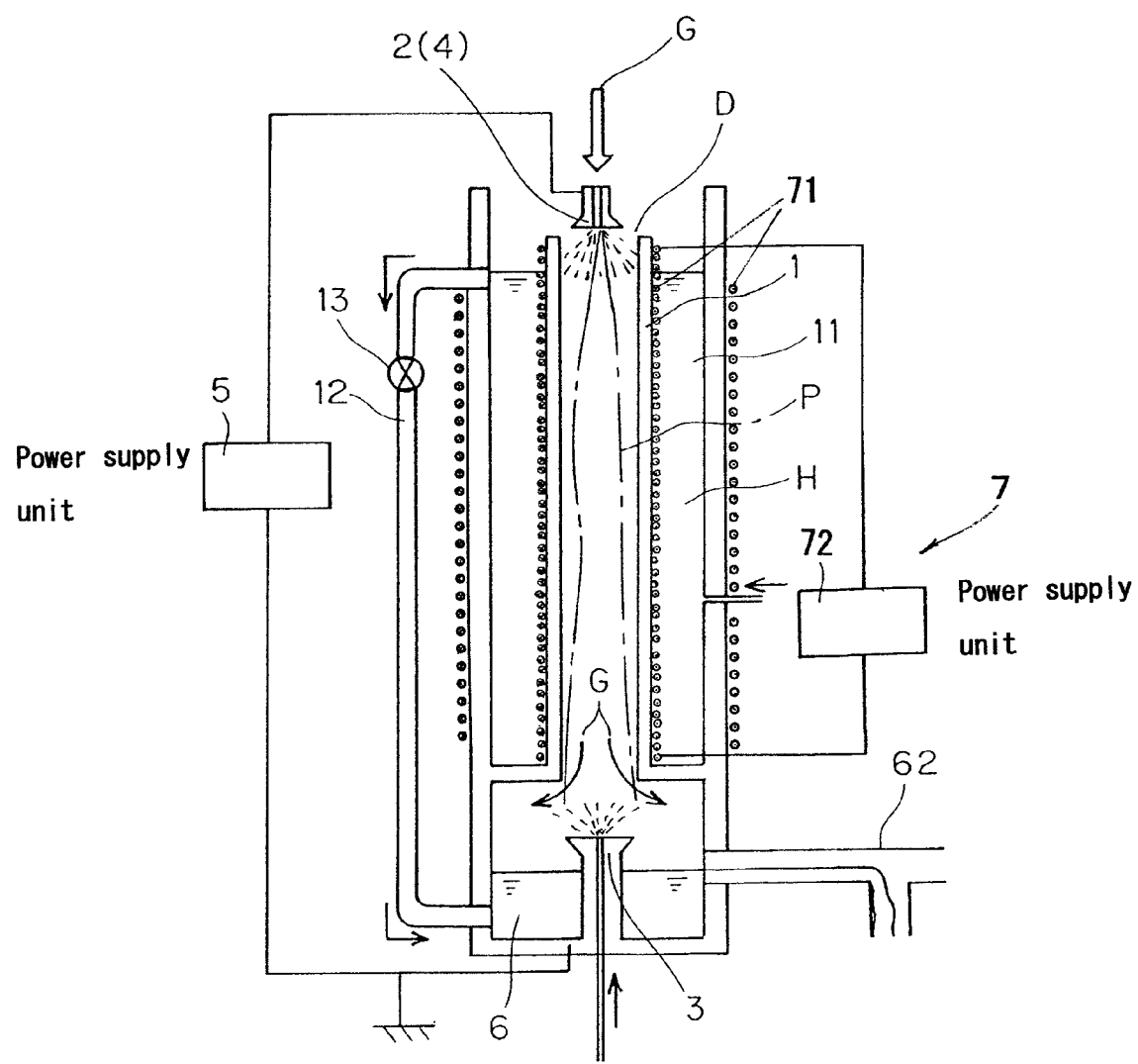
FIG. 1 is a sectional view of an embodiment of an exhaust gas treating apparatus using a control method of plasma by magnetic field in an exhaust gas treating apparatus of the invention.

FIG. 1 is a sectional view of an embodiment of an exhaust gas treating apparatus using a control method of plasma by magnetic field in an exhaust gas treating apparatus of the invention.

This exhaust gas treating apparatus is designed to decompose and treat harmful substances included in an exhaust gas such as CF4, SF6, or PFC gas, by making use of plasma generated between electrodes at an atmospheric pressure.

In this exhaust gas treating apparatus, including a reaction tube 1 for composing a plasma discharge space for feeding an exhaust gas G, an upper electrode 2 disposed in the air at the upper side of the reaction tube 1, and a lower electrode 3 disposed at the lower side of the reaction tube 2, a current path is formed between the electrodes 2 and 3, and a plasma P is generated in the reaction tube 1.

In this case, a spray nozzle 4 for spraying an electrolyte solution D may be disposed between the upper electrode 2 and the lower electrode 3 (in this embodiment, the upper electrode 2 also functions as the spray nozzle 4 for spraying an electrolyte solution), and by spraying the electrolyte solution D between the upper electrode 2 and the lower electrode 3, a plasma can be generated stably in the reaction tube 1.

The reaction tube 1 is a tubular body in a vertical position, and is composed of a heat-resistant material, such as aluminum oxide, mullite (a compound of aluminum oxide and silicon dioxide), quartz, zirconia, other ceramics, vinyl chloride resin, or other synthetic resins.

The reaction tube 1 may be air-cooled, but in this embodiment, a water-cooled jacket 11 is disposed around the reaction tube 1, for cooling the reaction tube 1 when generating plasma, and returning water H into the reaction tube 1 for cleaning when the plasma is stopped.

The water H of the water-cooled jacket 11 is supplied from the lower part of the water-cooled jacket 11 when generating plasma, and flows from an overflow line 12 to a water tank 6, and is discharged from an overflow line 62. The water H may be either fresh water or circulating wastewater.

When stopping the plasma, by closing a valve 13 of the overflow line 12, the water H is returned to the inside of the reaction tube 1 to clean.

Exhaust gas G is introduced from an upper opening part of the reaction tube, and is discharged from a lower opening part of the reaction tube 1 after harmful substances are decomposed by the plasma P.

The upper electrode 2 is composed of a conductive material, such as stainless steel, Hastelloy, tungsten, or SiC, and is disposed in the air in the upper opening part of the reaction tube 1, and a high-voltage current is applied from a power supply unit 5. The polarity of the upper electrode 2 and the lower electrode 3 is not particularly specified.

In this case, the upper electrode 2 may be composed as follows.

(1) The upper electrode 2 functions as the spray nozzle 4 for spraying an electrolyte solution (corresponding to this embodiment).

Figure 2:
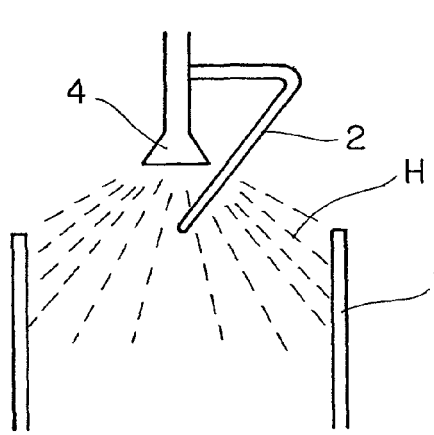
FIG. 2 is a sectional view of a modified embodiment of an upper electrode.
Figure 2:
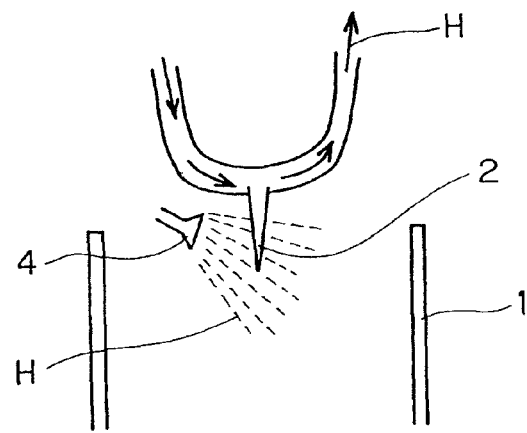
Figure 2:
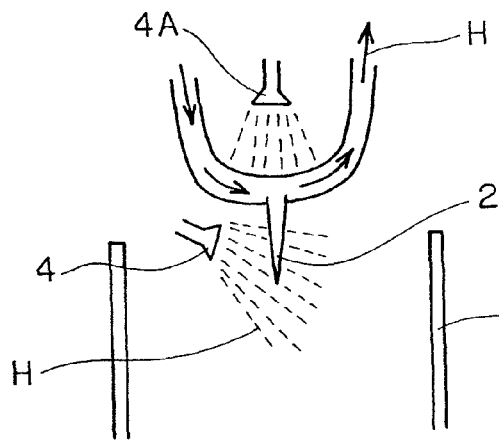
Figure 2:
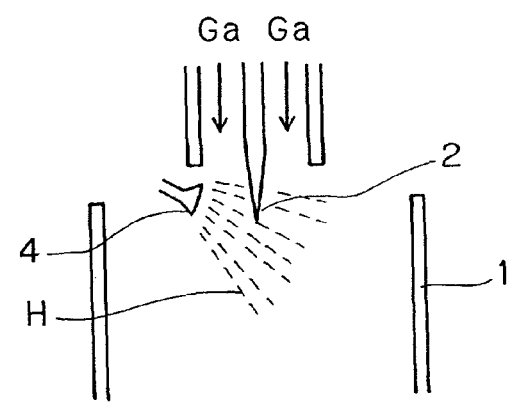

(1') The upper electrode 2 and the spray nozzle 4 for spaying an electrolyte solution are disposed separately (FIG. 2 (a)).

(2) Water H flows in the inside of the upper electrode 2 for cooling (FIG. 2 (b)).

(3) A spray nozzle 4A for spraying water is disposed outside of the upper electrode 2 for cooling and corrosion preventive purposes (FIG. 2 (c)).

(4) A shielding gas (inert gas) Ga flows outside of the upper electrode 2 for cooling and corrosion preventive purposes (FIG. 2 (d)).

In this manner, the upper electrode 2 exposed to high temperature can be efficiently cooled, and corrosion is prevented, and consumption of the upper electrode 2 can be prevented, and the water H sprayed for cooling and corrosion preventive purposes may be also used for the purposes of cooling or dissolving of exhaust gas G, or removal of powder, as a scrubber.

The lower electrode 3 is composed of a conductive material, such as stainless steel, Hastelloy, tungsten, or SiC, and is disposed in a lower part of the reaction tube 1 for serving also as a scrubber for spraying water for cooling and corrosion preventive purposes.

The water H sprayed from the lower electrode 3 for cooling and corrosion preventive purposes is discharged from the water tank 6 by way of the overflow line 62. The water H for cooling and corrosion preventive purposes may be either fresh water, or circulating wastewater, or ammonia water or other chemical solution.

In this case, the lower electrode 3 may be composed as follows.

(5) The lower electrode 3 is formed as a nozzle for spraying water for cooling and corrosion preventive purposes (corresponding to this embodiment).

(6) The lower electrode 3 is formed in a shape for overflowing the water H for cooling and corrosion preventive purposes (FIG. 3 (a)).

(7) Water H flows in the inside of the lower electrode 3 for cooling (FIG. 3 (b)).

(8) A scrubber nozzle 64 is disposed outside of the lower electrode 3 for cooling and corrosion preventive purposes (FIG. 3 (c)).

(9) The lower electrode 3 is immersed in the water tank 6 (FIG. 3 (d)).

In this manner, the lower electrode 3 exposed to high temperature can be efficiently cooled, and corrosion is prevented, and consumption of the lower electrode 3 can be prevented, and the water H sprayed for cooling and corrosion preventive purposes may be also used for the purposes of cooling or dissolving of exhaust gas G, or removal of powder, as a scrubber.

In the embodiment, the spray nozzle 4 serving also as the upper electrode 2 is disposed in an upper opening part of the reaction tube 1, and sprays an electrolyte solution D between the upper electrode 2 and the lower electrode 3.

Spraying of the electrolyte solution D by this spray nozzle 4 may be stopped after ignition of the plasma P, or may be continued.

Spraying of the electrolyte solution D may form a route of current between the upper electrode 2 and the lower electrode 3, so that the plasma P may be generated easily.

The electrolyte solution D may be any solution dissolving electrolytes such as NaCl, $CaCl_2$, $MgCl_2$, $NH_4Cl$, NaOH, or the like, and in particular by using an alkaline electrolyte solution, the acidic exhaust gas may be neutralized.

Figure 4:
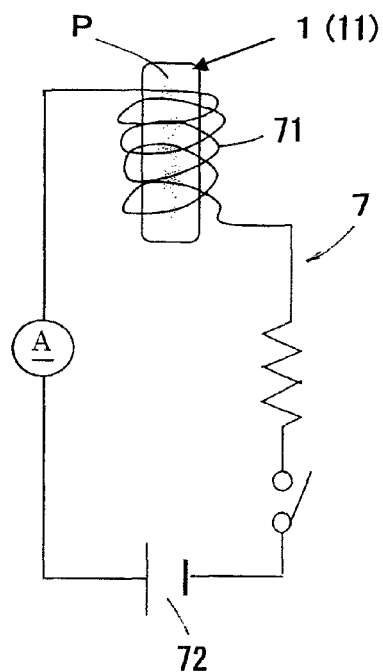
FIG. 4 is a principle diagram of control method of plasma by magnetic field in the exhaust gas treating apparatus of the invention, showing a current flowing method from a power supply unit into a coil disposed on the outer circumference of a reaction tube (and/or water-cooled jacket).
Figure 5:
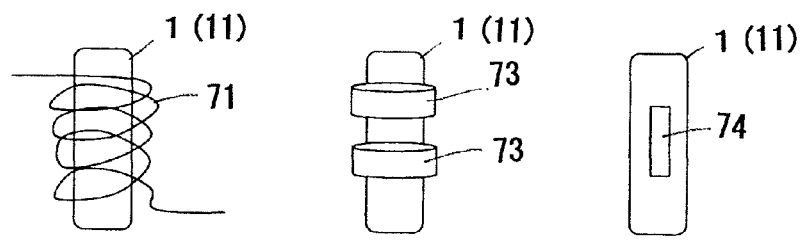
FIG. 5 is a principle diagram of control method of plasma by magnetic field in the exhaust gas treating apparatus of the invention, in which (a) shows a current flowing method from a power supply unit into a coil disposed on the outer circumference of a reaction tube (and/or water-cooled jacket), (b) shows a method of disposing an annular magnet on the outer circumference of a reaction tube (and/or water-cooled jacket), and (c) shows a method of disposing a bar-like or sheet-like magnet on the outer circumference of a reaction tube (and/or water-cooled jacket).

In the exhaust gas treating apparatus of the embodiment, as shown in FIG. 1, FIG. 4, and FIG. 5 (a), on the outer circumference of the reaction tube and (/or) the water-cooled jacket 11 for composing the plasma discharge space for feeding the exhaust gas G (in the embodiment, inclusively called the outer circumference of the plasma discharge space or the outer circumference of the reaction tube 1), a coil 71 is disposed as magnetic field generating means 7, and by passing a current from a power supply unit 72 to this coil 71 (direct current, although not particularly limited in the embodiment), a magnetic field (not particularly specified, a magnetic field having a lie of magnetic force acting from the upper electrode 2 to the lower electrode 3 in the embodiment) is generated in the plasma discharge space (in the reaction tube 1 as plasma discharge space).

Herein, the coil 71 as magnetic field generating means 7 may be disposed on the outer circumference of either one of the reaction tube 1 and the water-cooled jacket 11 for composing the plasma discharge space.

As a result, by controlling the state of the plasma P generated in the reaction tube 1 for composing the plasma discharge space, specifically, a Lorenz force acts on charge particles forming the plasma P by the action of the magnetic field, and scattering of electrons and charge particles can be prevented, and the state of the plasma P can be controlled, and the loss of plasma P spent without being used effectively can be decreased, and it is possible to enhance the treating efficiency of exhaust gas by plasma P, without extremely increasing the consumption of energy or lowering the absolute amount of treatment.

The action is explained below by referring to FIG. 6.

Supposing the angle between the line of magnetic force and the flow direction of electrons to be ?, a Lorenz force acts on electrons and particles in the reaction tube 1 (other than neutral particles), and its force F is expressed in the following formula.

$$F=q(E+v\times B\sin\theta) \quad (1)$$

where E is an electric filed, q is a charge amount, and v is a velocity of particles.

In a region of $\theta=0°$ (a central region of the reaction tube 1), F=0, and no Lorenz force acts, but when electrons and other charge particles are scattered out of the vertical direction in FIG. 6 (the center in the reaction tube 1), F is active, and the scatter is suppressed.

As a result, in this region, it is possible to minimize the loss of plasma lost by colliding against the reaction tube 1.

On the other hand, in a region of $\theta \neq 0°$ (an end region of the reaction tube 1), the Lorenz force acts in both vertical directions of v and B (in terms of vector, the outer product of v and V), and the motion energy in the vertical direction is maintained the same, and is changed to cyclotron motion (spin motion) of charge particles.

Consequently, in this region, the plasma density is high, and the exhaust gas G passing through this region is higher in the collision probability to thermions and excited charge particles, as compared with other state free from magnetic field, so that the treating efficiency (decomposition efficiency) may be enhanced.

The magnetic field generating means 7 is not limited to the embodiment, in which an electric current is applied from the power supply unit 72 into the coil 71 disposed on the outer circumference of the reaction tube 1 for composing the plasma discharge space for feeding the exhaust gas G (and/or the water-cooled jacket 11), but as shown in FIGS. 5 (b) and (c), an annular magnet 73 or a bar-like or sheet-like magnet 74 may be disposed on the outer circumference of the reaction tube 1 (and/or the water-cooled jacket 11).

EXAMPLES

As shown in FIG. 1, on the outer circumference of the reaction tube 1 and the water-cooled jacket 11 for composing the plasma discharge space for feeding the exhaust gas G, as magnetic field generating means 7, a coil 71 is disposed, and by applying an electric current (direct current) to this coil 71 from a power supply unit 72, a magnetic field is generated (a magnetic field having the line of magnetic force acting from the upper electrode 2 to the lower electrode 3), so that the exhaust gas G is decomposed as $CF_4$.

The result is shown in Table 1.

TABLE 1

| Current (A) | Decomposition rate of $CF_4$ (%) |
|---|---|
| 0 | 92.5 |
| 1.5 | 96.8 |
| 2.2 | 98.5 |

As shown in Table 1, it is known that the decomposition rate of $CF_4$ is raised when the current flowing in the coil 71 is increased.

This explanation is about an embodiment of the control method of plasma by magnetic field in an exhaust gas treating apparatus of the invention and an exhaust gas treating apparatus using the same method, but the invention is not limited to this embodiment alone, but may be changed and modified within a range not departing from the true spirit thereof.

INDUSTRIAL APPLICABILITY

A control method of plasma by magnetic field in an exhaust gas treating apparatus of the invention and an exhaust gas treating apparatus using the same method are capable of enhancing the treating efficiency of exhaust gas by plasma, in a simple method and structure, without extremely increasing the consumption of energy, or without lowering the absolute amount of treatment, and as described in the embodiment, the invention may be preferably applied in treatment of exhaust gas.

The invention claimed is:

1. An exhaust gas treating apparatus for decomposing and treating an exhaust gas, the apparatus comprising:
   a reaction tube into which the exhaust gas is introduced and in which plasma is generated, the reaction tube being formed of a heat-resistant material and having an upper opening for receiving the exhaust gas and a lower opening for discharging the exhaust gas;

an upper electrode disposed in the upper opening of the reaction tube;

a lower electrode disposed in the lower opening of the reaction tube;

a water cooled jacket disposed around the reaction tube for cooling the reaction tube; and a coil arranged so as to:

wind around a full length of the reaction tube directly on an outer circumferential surface of the reaction tube and within the water-cooled jacket; and also wind around an outer circumferential surface of the water-cooled jacket and directly on the outer circumferential surface of the water-cooled jacket, the coil being further configured to generate a magnetic field between the upper electrode and the lower electrode when a current is applied to the coil, wherein the plasma is generated in the reaction tube between the upper electrode and the lower electrode, and wherein the coil is configured such that the state of the plasma generated in the reaction tube is controlled by generating the magnetic field in the reaction tube.

2. The apparatus of claim 1, further comprising a spray nozzle for spraying an electrolyte solution into the reaction tube.

3. The apparatus of claim 2, wherein the upper electrode is formed as the spray nozzle such that the spray nozzle and the upper electrode have a one-piece construction.

4. The apparatus of claim 1, wherein the heat-resistant material of the reaction tube is a ceramic material.

5. The apparatus of claim 1, wherein the heat-resistant material of the reaction tube is a synthetic resin.

6. The apparatus of claim 1, wherein the coil is wound around the reaction tube so as to surround both the upper opening of the reaction tube and the lower opening of the reaction tube.

* * * * *